United States Patent [19]

Yamaguchi

[11] 4,425,890

[45] Jan. 17, 1984

[54] SPARK TIMING CONTROL APPARATUS FOR USE WITH A INTERNAL COMBUSTION ENGINE

[75] Inventor: Hiroshi Yamaguchi, Yokosuka, Japan

[73] Assignee: Nissan Motor Company, Limited, Yokohama, Japan

[21] Appl. No.: 306,852

[22] Filed: Sep. 29, 1981

[30] Foreign Application Priority Data

Sep. 29, 1980 [JP] Japan .................... 55-134273

[51] Int. Cl.³ .................................. F02D 37/02
[52] U.S. Cl. .................. 123/418; 123/417; 123/422; 123/423; 123/480; 364/734
[58] Field of Search .............. 123/416, 417, 418, 422, 123/423, 480, 488, 478, 494, 415; 364/431.04, 431.05, 431.08, 431.12, 734, 575

[56] References Cited

U.S. PATENT DOCUMENTS 4,051,818 10/1977 Völckers .......................... 123/494
4,081,995 4/1978 Griffith et al.
4,220,125 9/1980 Nishida et al. ...................... 123/416
4,280,189 7/1981 Takato et al. ................... 364/431.12
4,286,560 9/1981 Sagisaka et al. .................... 123/416
4,290,107 9/1981 Suda et al. .......................... 123/480
4,317,182 2/1982 Takase et al. .................. 364/431.04

Primary Examiner—Charles J. Myhre
Assistant Examiner—Andrew M. Dolinar
Attorney, Agent, or Firm—Schwartz, Jeffery, Schwaab, Mack, Blumenthal & Koch

[57] ABSTRACT

A spark timing control circuit for eliminating abnormal vibrations in a spark ignition, fuel-injected internal combustion engine. The vibrations are created by twisting vibrations of the driving system ocurring when the engine operation is switched from deceleration to acceleration. In such cases, spark timing for the engine is calculated using a smoothed parameter of at least one of the vehicle speed and a fuel injection time duration which itself is calculated as a function of intake air flow rate.

34 Claims, 13 Drawing Figures

SPARK TIMING CONTROL APPARATUS FOR USE WITH A INTERNAL COMBUSTION ENGINE

BACKGROUND OF THE INVENTION

The present invention relates to a spark timing control apparatus for use with a spark ignition internal combustion engine, and more particularly to a spark timing control system of the type wherein a variable, corresponding to the engine speed, is used to determine the spark timing. More particularly, the present invention relates to a spark timing apparatus of the above type and having a device for preventing abnormal vibrations of the engine due to fluctuations in spark timing corresponding to fluctuations in the sensed engine speed occurring for a certain time after the engine operation is switched from deceleration to acceleration.

A spark timing control apparatus has been proposed which includes a microcomputer which calculates a basic fuel injection time duration using sensed current engine speed and sensed current flow rate of intake air into the engine. The basic fuel injection time duration is the adjusted according to other parameters, such as, for example, constants determined by the temperature of the engine cooling water, the battery voltage and the output of an oxygen meter provided in the exhaust system. The microcomputer within the control apparatus then retrieves the value of spark timing determined by engine speed from an engine speed—spark timing advance angle characteristic stored in a ROM when either (1) a throttle switch is detected to be on (i.e., the throttle valve is detected to be completely closed), or determined by engine speed and fuel injection time from an engine speed-fuel injection time-spark timing advance characteristic when the throttle switch is detected to be off (i.e., the throttle valve is detected to be not completely closed). Each time the crankshaft is rotated through 360 degrees, fuel injection is effected for the calculated injection time duration and spark ignition is effected at a calculated angular position before the top dead center position each time a certain numbers of references pulses are inputted into the computer.

When the engine operation is switched from the deceleration state where the throttle valve is closed to the acceleration state where the throttle is opened, the engine speed fluctuates for a time due to twisting vibrations of the driving system, including the engine and transmission. These vibrations are created by the fact that the driving system, which has been driven so far by the vehicle body during deceleration, begins to drive the vehicle body in an opposite sense during acceleration. Thus the value of engine speed sensed by the crank angle sensor fluctuates according to the frequency inherent in the driving system.

As described above, the optimal spark timing angular value when the throttle valve is open is retrieved according to the sensed current engine speed and the corrected fuel injection time duration, which is calculated according to engine speed. Thus when the engine speed fluctuates, the corrected fuel injection time duration also fluctuates so that the spark timing retrieved from the ROM according to the sensed actual engine speed and the fuel injection time duration greatly fluctuates. When the spark timing fluctuates, the output torque of the engine fluctuates also so that with prior control systems, for a short time after the vehicle operation changes from deceleration to acceleration, the vehicle tends to fluctuate in the fore-and-aft direction of the vehicle, resulting in an uncomfortable feeling for the passagers.

It is therefore an object of the present invention to provide a spark timing control apparatus for use with a spark ignition engine which prevents abnormal vibrations of the vehicle due to fluctuations of spark timing.

SUMMARY OF THE INVENTION

The present invention provides a spark timing control apparatus for use with a spark ignition combustion engine, comprising means for sensing the engine speed to output a first parameter indicative of the engine speed, and means for calculating a fuel injection amount using the first and a plurality of second operational parameters to output a third parameter indicative of the fuel injection amount. The apparatus also comprises means for smoothing at least one of the first and the plurality of second parameters and means for calculating a spark timing using the first and the plurality of second parameters at least one of which is smoothed by the smoothing means.

BRIEF DESCRIPTION OF THE DRAWINGS

The features and advantages of the present invention will be apparent from the following description of preferred embodiments thereof when taken in conjunction with the accompanying drawings in which.

DETAILED DESCRIPTION OF PREFERRED EMBODIMENTS

Figure 1:
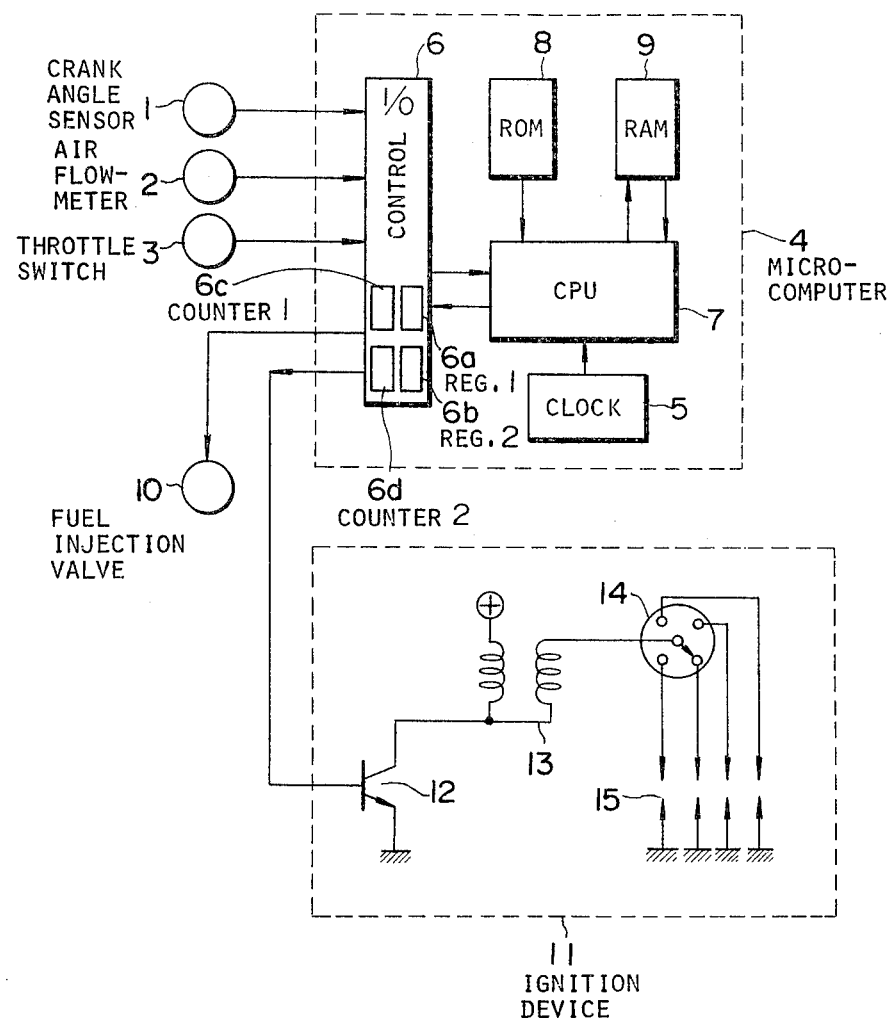
FIG. 1 is a schematic diagram of a conventional spark timing control system by which the present invention is carried out.

Referring to FIG. 1, there is shown a spark timing control apparatus which carries out the spark timing control in accordance with the present invention. The apparatus includes a crank angle sensor 1 which produces a unit pulse each time the crankshaft, not shown, rotates through a unit angle, for example one degree, and a reference angle pulse each time the crankshaft rotates through a reference angle (120 degrees in the case of a 4-cycle-6 cylinders, and 180 degrees in the case of a 4-cycle-4-cylinders). The apparatus also includes an air flowmeter 2 which determines the flow rate of intake air into the engine, not shown, and a throttle switch 3 which detects whether or not the throttle valve, not shown, is completely open.

The apparatus further includes a microcomputer 4 which includes a clock pulse generator 5, an input/output (I/O) control unit 6, a central processing unit 7, a read only memory (ROM) 8, and a random access memory (RAM) 9. The apparatus also includes a fuel injection valve 10 connected to the I/O control circuit 6. The apparatus also includes a ignition device 11 which includes a transistor 12 connected to the I/O control circuit 6, an ignition coil 13 connected to the transistor 12, a distributer 14 connected to the ignition coil 13, and a plurality of spark plugs 15. The circuit may also include well known protection means such as a diode circuit (not shown).

In operation, the microcomputer 4 counts unit pulses supplied from the crank angle sensor 1, during a fixed time interval through the I/O control circuit 6 to calculate the engine speed N. The output of the air flowmeter 2 is subjected to analog to digital conversion at the I/O control circuit 6 to provide a signal Q indicative of the flow rate of intake air. The microcomputer operates in response to a stored program, stored in ROM 8, to determine the basic fuel injection amount. The calculation repetition rate may be made in response to the rotation of the engine crankshaft or at a fixed time interval. Most preferable, the microcomputer 4 calculates at constant time intervals, for example 10 ms, a basic fuel injection amount or pulse duration $T_p$ and then a corrected fuel injection pulse amount of duration $T_i$ given by $$T_p = K_o(Q/N) \qquad \text{Eq. 1}$$

$$T_i = T_p(1+K_1)K_2 \qquad \text{Eq. 2}$$

where $K_o$ is a constant determined according to the characteristics of the fuel injection valve 10 and the air flowmeter 2, $K_1$ is a correction constant determined according to the temperature of engine cooling water and the output voltage of a vehicle battery, and $K_2$ is a correction constant determined according to the oxygen sensor provided in the exhaust gas system.

The injection pulse duration $T_i$, thus calculated, is set in a first register 6a of the I/O control circuit 6. The spark timing calculation may be preformed in the main program of the microcomputer 4 whereas the $T_p$ calculation is done as an interrupt routine each time the computer system clock counts a predetermined time interval, for example, 10 ms. The main program is sometimes referred to as the background program.

Figure 2:
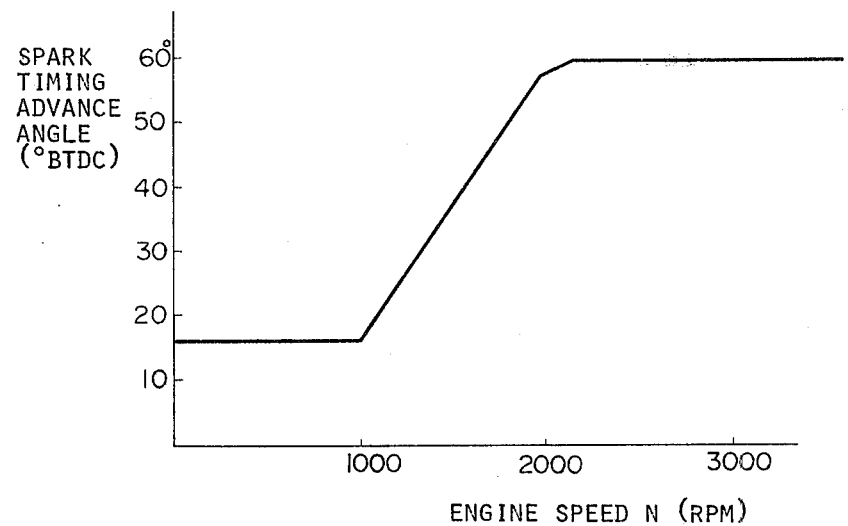
FIG. 2 shows the relationship between engine speed and spark timing advance angle before TDC.

The calculation of the spark timing may be done a number of ways as explained more fully below. Generally, it is first determined whether or not the throttle switch 3 is on. In one embodiment, when the switch 3 is on, that is, when the throttle valve is completely closed, a value of spark timing corresponding to the sensed engine speed N is retrieved from the characteristic data of FIG. 2 stored in the ROM 8. The retrieved data is stored in a second register 6b of the I/O control circuit 6. On the other hand, when the throttle switch 3 is off, that is, when the throttle valve is not completely closed, the calculated value $T_p$ is smoothed or weighted so as to provide $T_p'$ as follows:

$$T_p = \frac{1}{n} \times T_p + \frac{n-1}{n} \times RAM.E_1 \qquad \text{Eq. 3}$$

where n is a predetermined constant, and $RAM.E_1$ is the value of $T_p$ obtained during the previous calculation and stored in the address $E_1$ of the RAM 9. Thus, the spark timing is determined by the smoothed injection time duration $T_p'$ and the sensed engine speed N from the characteristics of FIG. 3 stored in the ROM 8.

The value of the spark timing advance, thus calculated, is then stored in the second register 6b of the I/O control circuit 6.

Figure 4:
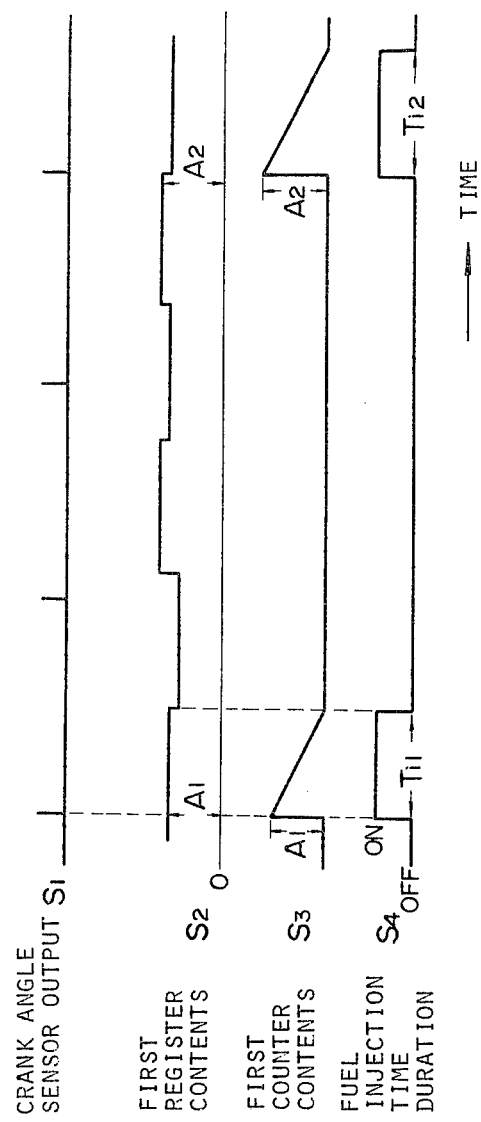
FIG. 4 is a timing chart illustrating crank angle sensor output, first-register contents, first-counter contents, and fuel injection time duration.

The I/O control circuit 6 drives the fuel injection valve 10 for fuel injection according to the contents of the first registor 6a each time the crankshaft rotates; each time three reference angle pulses are inputted into the I/O control circuit 6 (in the case of 6-cylinder engine), or each time two reference angle pulses are inputted into the I/O control circuit 6 (in the 4-cylinder engine). For example, as shown in FIG. 4, each time three reference angle pulses $S_1$ are inputted into the I/O control circuit 6 in the case of the 6-cylinder engine, the contents $A_1$ of the first register 6a are set into a first counter 6c of the I/O control circuit, at which time the fuel injection valve 10 is formed. The counter 6c counts down in response to clock pulses of a high frequence clock which is available from the clock pulse generator 5. The clock pulses have a very short period compared with that of the reference angle pulse signal from the crank angle sensor 1, as may be seen in FIG. 5. These clock pulses are connected in counter 6c, and, when the contents of the counter 6c become zero the fuel injection valve 10 is shut off. The time duration during which the fuel injection valve 10 is open equals the fuel injection pulse duration Ti (see FIG. 4).

Figure 5:
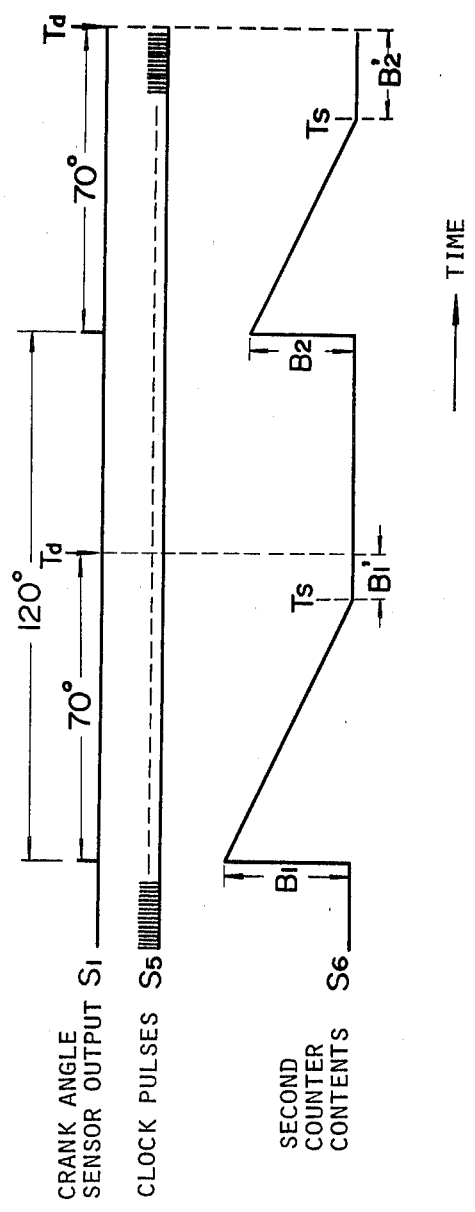
FIG. 5 is a timing chart illustrating the relationship among crank angle sensor output, clock pulse signal, and second counter contents.

Each reference angle pulse $S_1$ is produced at a fixed angular position before TDC, for example, 70 degrees. The I/O control circuit 6 drives the ignition device 11 each time a reference angle pulse $S_1$ is inputted thereto according to the contents of the second register 6b. For example, as shown in FIG. 5, the reference angle pulse $S_1$ is inputted at an angular position of 70° before the top dead center $T_d$. In response to this signal, the contents $B_1$ of the second register 6b is set into a second counter 6d. Counter 6d receives and counts down the clock pulses having a very short period compared with that of the reference angle pulse signal $S_1$. At the same time, the electrical current begins to flow through the transistor 12 and the ignition coil 13. When the contents of the second counter 6d becomes zero, the transistor 12 is turned off, thereby performing a spark ignition. In this connection, the crank angle B' from the spark timing $T_s$ to the top dead center $T_d$ designates a spark timing advance angle before $T_d$.

Figure 6:
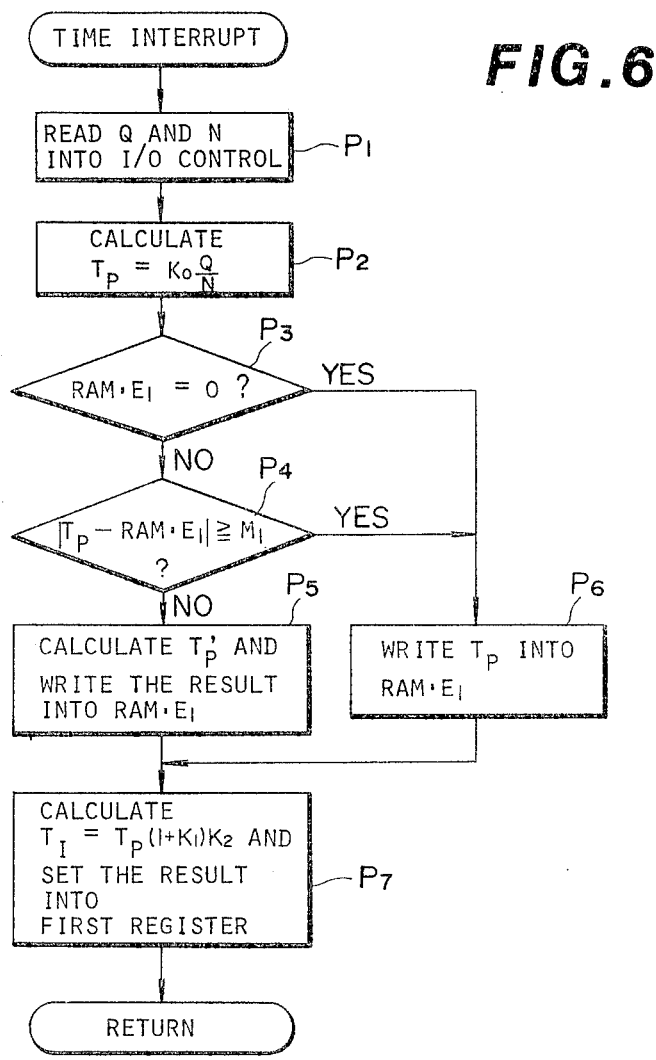
FIG. 6 is a flowchart showing execution of the calculation of the fuel injection time duration.
Figure 7:
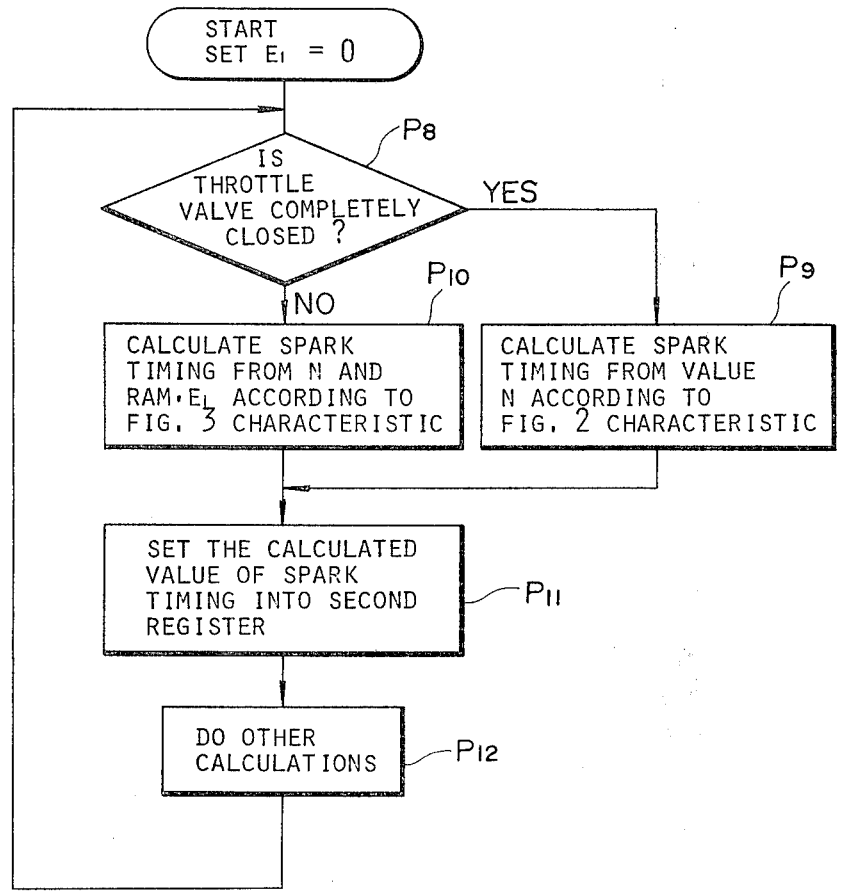
FIG. 7 is a flowchart showing execution of the calculation of the spark timing.

FIGS. 6 and 7 illustrate one method of programming the microcomputer 4 to effect operation of the control apparatus.

Referring to FIG. 6, a flow chart of the interrupt routine is shown for calculating the injection pulse durations $T_i$. At the step $P_1$, the sensed current engine speed N and the flow rate of intake air Q are read into the I/O control circuit 6, and then at the step $P_2$, $T_p$ is calculated in the CPU 7 according to Equation 1. At step P3, it is determined whether or not the contents of RAM 9 at the address $E_1$ are zero, i.e., the value of $T_p$ calculated during the previous calculation. When the determination indicates NO, the program proceeds to the step P4 where it is determined whether or not the absolute value of the difference "$T_p$-RAM.$E_1$", where RAM.$E_1$ is the latest contents of $T_p$ stored at the address $E_1$ of the RAM 9, is greater than a predetermined value $M_1$. If the determination is NO, the program proceeds to the step P5 where $$T_p = \frac{1}{n} \times T_p + \frac{n-1}{n} \times \text{RAM}.E_1$$

is calculated and the result is stored in the address of RAM.$E_1$. As described before, the calculated duration $T_p'$ consists of the sum of the weighted latest value stored in RAM.$E_1$ and the $T_p$ calculated this time and weighted. When this routine of FIG. 6 is repeated every 10 ms, the appropriate value of n is a value within the range of 32 to 128, preferably 64.

On the other hand, if the determination at the step P3 is YES, which indicates that the engine is just starting and an initial calculation is made, at which time the contents at the RAM address $E_1$ is 0, the program proceeds to the step P6 where the value of $T_p$ (calculated at the step P2) is written in the RAM address $E_1$.

If the determination at step P4 is YES, it indicates that the difference in the absolute value of ($T_p$−RAM.$E_1$) is very great, and corresponds to a sudden change in the optimal value of spark timing, such as, for example at the moment when the throttle valve goes from a closed to open position. In such a situation, it is necessary to suddenly change the spark timing to follow a new optimal value so that the program proceeds to the step P6 where the value of $T_p$ as calculated at P2 is written in the RAM address $E_1$.

At the step P7, the actual fuel injection pulse duration $T_i = T_p(1+K_1)K_2$ is calculated according to the value $T_p$ calculated at the step P2 and the result is set in the first register 6a of the I/O control circuit 6. After step P7 the interrupt routine returns to the main program shown by the flowchart of FIG. 7.

When the main program of FIG. 7 is first started, various parameters are initialized such as, for example, $E_1=0$. After initialization, at the step P8, it is determined whether or not the throttle valve is completely closed. If the determination is YES, the program proceeds to the step P9 and calculates a spark timing corresponding to the actual engine speed N according to the characteristics of FIG. 2 stored in the ROM 8, by using a table look-up method.

Figure 3:
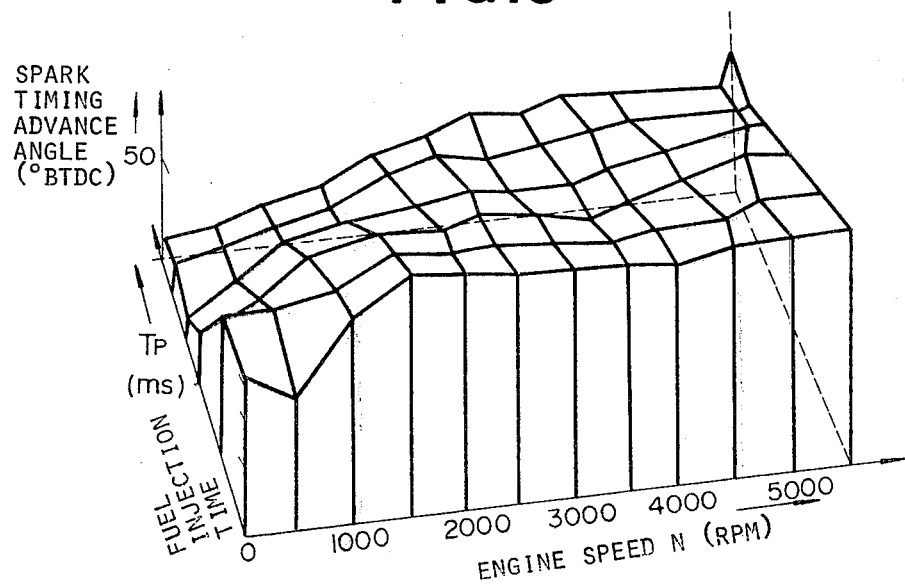
FIG. 3 shows the relationship between engine speed, fuel injection time duration and spark timing advance angle before TDC.

On the other hand, when the determination is NO at the step P8, a spark timing is determined at the step P10 corresponding to the contents of $T_p$ or $T_p'$ stored at the RAM address $E_1$ and the sensed engine speed according to the FIG. 3 characteristics stored in the ROM 8. At the step P11, the value of the spark timing calculated at the step P9 or P10 is set in the second register 6b of the I/O control circuit 6. At the step P12, other calculations may be performed and the main program loops back to step P8 to repeat the sequence. Each time a reference angle pulse is inputted to the microcomputer 4, the ignition device 11 is operated to count down the contents of the second register 6b as shown in FIG. 5.

Figure 8:
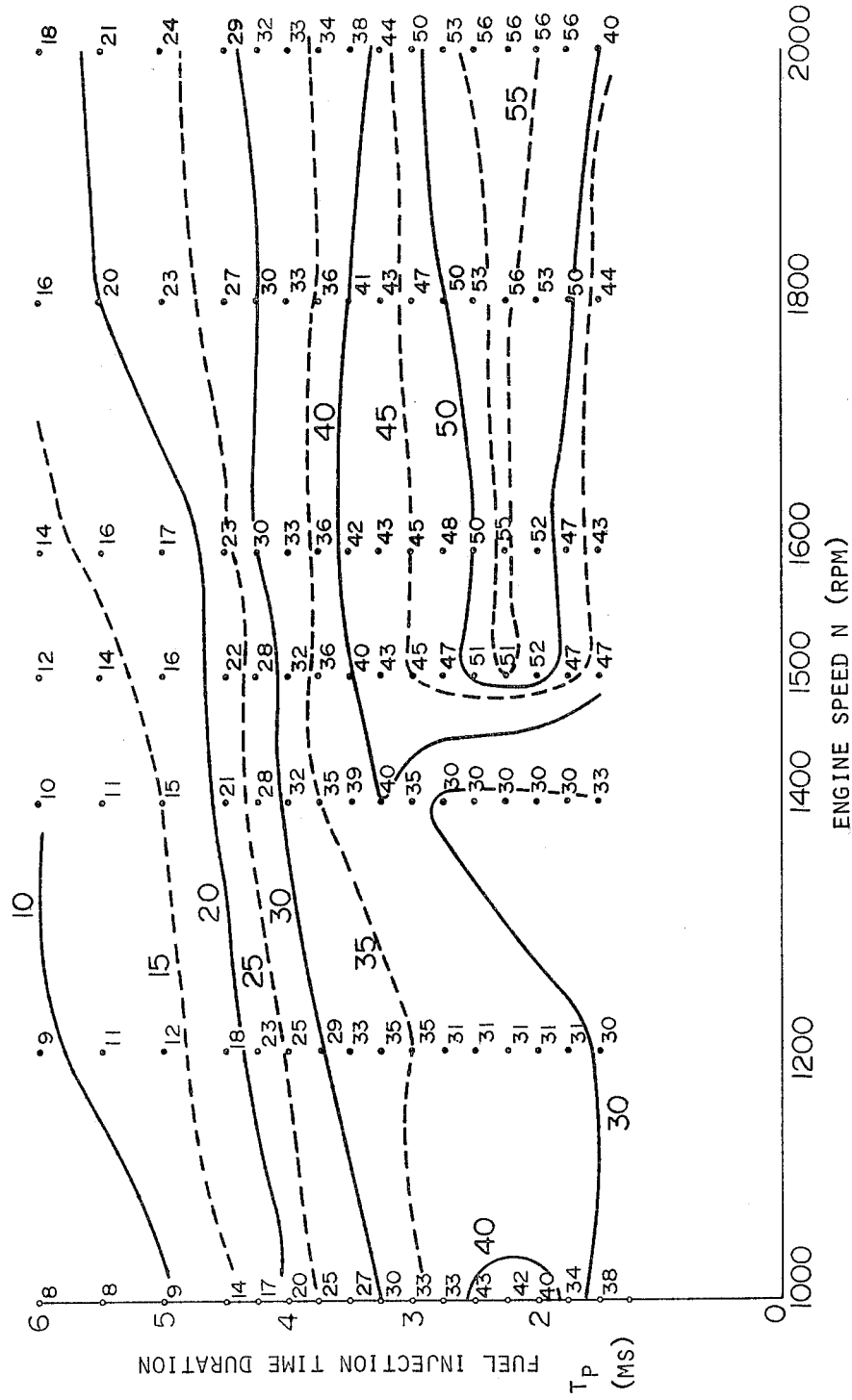
FIG. 8 is a two-dimensional graphic illustration of FIG. 3.

The FIG. 3 characteristics can be changed into a two-dimensional representation such as shown in FIG. 8 in which each of the numeral values with a dot before it indicates a spark timing advance angle in degrees before TDC and each of the curves passes through equal spark timing angle degrees before TDC. In FIG. 8 when the gradient of the spark timing corresponding to changes in $T_p$ is great and the gradient of the spark timing corresponding to changes in N is small, only $T_p$ is required to be smoothed as shown in FIGS. 6 and 7. In a similar fashion, it is possible to smooth the value of engine speed N using a formula such as that shown in equation 3 with N replacing $T_p$ and the contents stored in a designated register $E_2$. When the gradient of spark timing corresponding to changes in $T_p$ is small and the gradient of spark timing corresponding to changes in N is great, only N is required to be smoothed. When the gradient of spark timing corresponding to changes in both N and $T_p$ is great, both N and $T_p$ should be smoothed.

Figure 9:
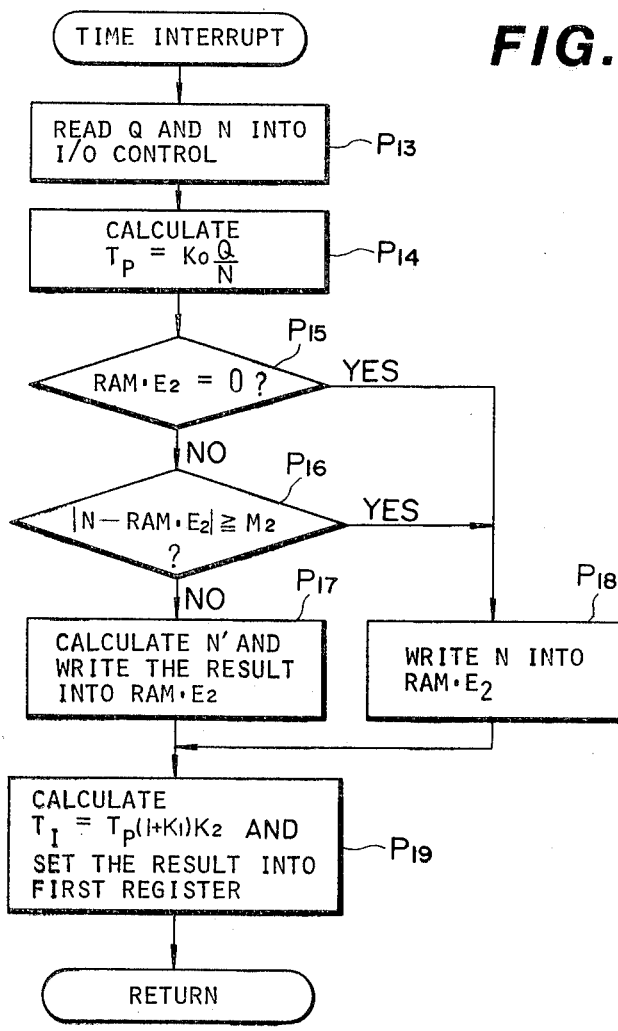
FIG. 9 is a flowchart modification of FIG. 6 showing calculation of the fuel injection time duration.
Figure 10:
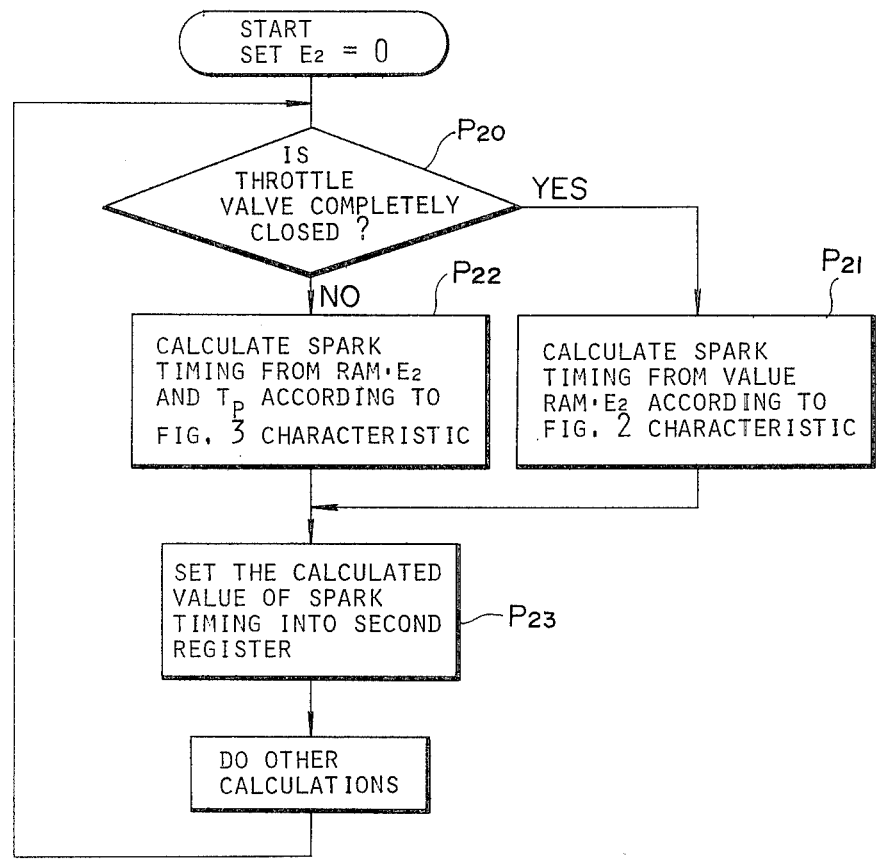
FIG. 10 is a flowchart modification of FIG. 7 showing calculation of the spark timing.

FIGS. 9 and 10 illustrate another method of programming the microcomputer 4 to effect operation of the control apparatus. FIG. 9 is an interrupt routine similar to that of FIG. 6, and FIG. 10 is a main program similar to that of FIG. 7. In steps P13 and P14 the values of Q and N are read and $T_p$ calculated. Memory location $E_2$ is then examined in step P15, and if equal to zero, the value of N is written into location $E_2$ in step P18. Otherwise the program proceeds to step P16 and the difference value (absolute value) N-RAM.$E_2$ is compared with a predetermined constant $M_2$. If the difference value is less than $M_2$ the program performs a smoothing operation using a formula similar to equation 3, namely, $$N' = \frac{1}{n} \times N + \frac{n-1}{n} \times \text{RAM}.E_2 \qquad \text{Eq. 4}$$

The smoothed value of N' is stored in RAM.$E_2$. The program then proceeds to step P19 to calculate Ti.

In FIG. 10, a main program similar to that of FIG. 7 is illustrated with steps P22 and P21 utilizing the smoothed value of N' as stored in RAM.$E_2$.

Figure 11:
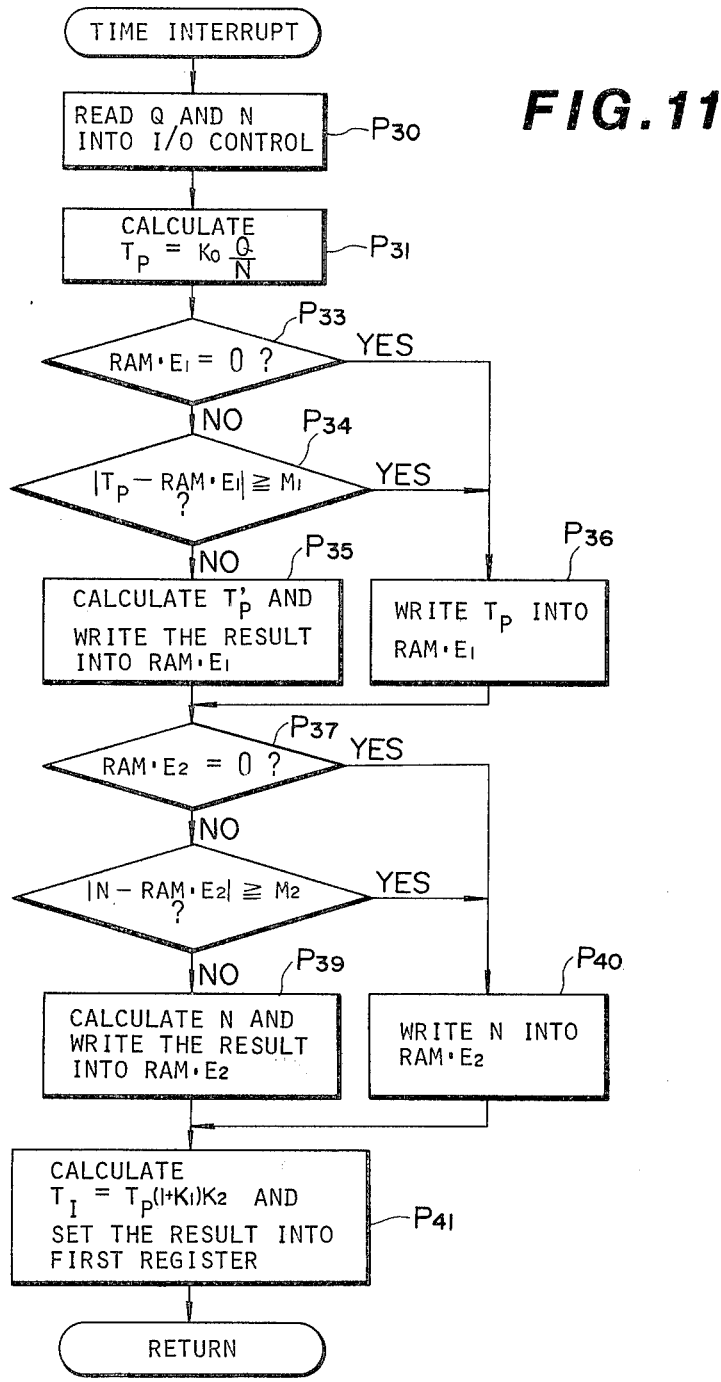
FIG. 11 is a further flowchart modification of FIG. 6.
Figure 12:
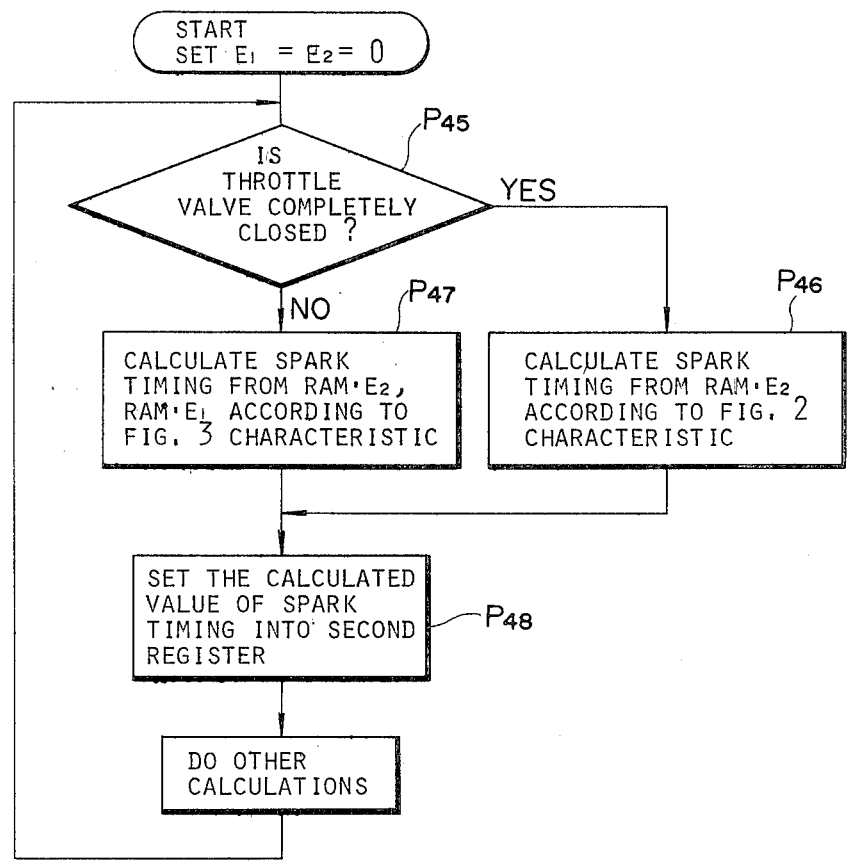
FIG. 12 is a further flowchart modification of FIG. 7.

FIGS. 11 and 12 illustrate another method of programming the microcomputer 4 to effect operation of the control apparatus. FIG. 11 combines the smoothing operation of FIGS. 6 and 9. In steps P30 and P31 the value of Q and N are read and $T_p$ calculated. Steps P33-P36 perform the $T_p'$ smoothing operation similar to steps P3-P6 of FIG. 6. Further Steps P37-P40 perform the smoothing operation of N' similar to steps P15-P18 of FIG. 9. In step P41, the fuel injected pulse amount Ti is calculated, and the program returns to the main program illustrated in FIG. 12.

In FIG. 12 the value of RAM addresses $E_1$ and $E_2$ are utilized in steps P46 and P47 as shown. Thus the smoothing operation is utilized for both $T_p$ and N and for deriving the ignition timing.

Figure 13:
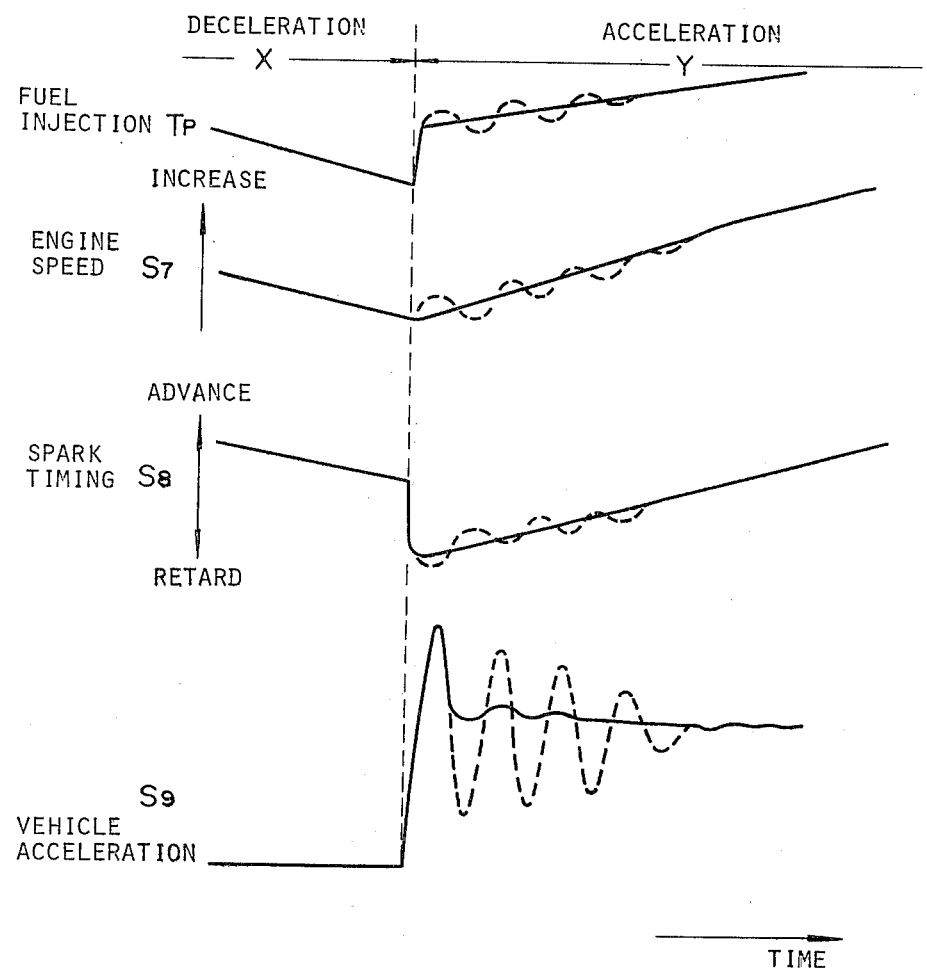
FIG. 13 is an illustration of the respective characteristics of the basic fuel parameter, engine speed, spark timing advance angle before TDC, and vehicle acceleration, especially in the transient area after the vehicle is switched from deceleration to acceleration.

In FIG. 13, the area, designated by X, situated on the left-hand side of a vertical straight broken line represents a time during which a vehicle is decelerated whereas the area, designated by Y, situated on the right-hand side of the vertical broken line represents a time during which the vehicle is accelerated. As will be seen from this figure, for a time period after the vehicle traveling conditions have changed from deceleration to acceleration, fluctuations in acceleration $S_9$ occurring in the fore-and-aft direction of the vehicle, in spark timing advance angle $S_8$, in engine speed $S_7$ and in the basic fuel parameter $T_p$ are greatly reduced, as shown in solid lines on the acceleration side, the broken line portions for $S_7$, $S_8$, $S_9$ and $T_P$ indicating their respective characteristics without using the smoothing circuits.

It is clear that the calculation of the spark timing may be done using both a smoothed engine speed signal $N'$ and a smoothed basic fuel injection pulse duration signal $T_p'$, or the spark timing may be calculated using either a smoothed basic fuel injection pulse duration signal $T_p'$ and an unsmoothed engine speed signal $N$, or an unsmoothed basic fuel injection pulse duration signal $T_p$ and a smoothed engine speed signal $N'$ to reduce fluctuations such as mentioned above. In this particular embodiment, the smoothing time constant should be of a value such as to sufficiently smooth fluctuations having very short periods such as mentioned above and as to substantially follow required changes in the engine speed signal and the basic fuel injection pulse duration signal. In the present invention, smoothed values are used for calculation only when the throttle valve is open so that $N$ and $T_p$ do not show sudden changes except for during the time when the fluctuations occur, as mentioned above.

While the invention has been described with respect to preferred embodiments thereof, various changes and variations thereof could be made by those skilled in the art without departing from the scope and spirit of the invention as set forth in the attached claims.

What is claimed is:

1. A spark timing control apparatus for use with a spark ignition of a fuel injected internal combustion engine, comprising:
   a throttle valve for controlling intake air flow into the engine;
   means for detecting if the throttle valve is closed;
   means for sensing engine speed and for outputting a first parameter indicative of the sensed engine speed;
   means for calculating a fuel injection amount using the first parameter and at least a second operational parameter and operable to output a third parameter indicative of the fuel injection amount;
   means for smoothing at least one of the first and third parameters;
   means, operative when said throttle valve is not closed, for determining spark timing using said first and third parameters, where at least one of said first and third parameters has been smoothed by the smoothing means;
   said determining means being further operable, when the throttle valve is not closed to select which of said first and third parameters should be smoothed and used.

2. The apparatus of claim 1, wherein said smoothing means includes means for taking a weighted average of at least one of said first and third parameters according to a predetermined relationship.

3. The apparatus of claim 2, wherein the predetermined relationship is defined as $$T_p' = \frac{1}{n} \times T_p + \frac{n-1}{n} \times RAM.E$$

where $T_p'$ is the weighted average, $T_p$ is the calculated value of said third parameter, RAM.E is a previously obtained weighted average value $T_p'$, and n is a predetermined integer constant.

4. The apparatus of claim 3, wherein n is in the range of 32 to 128, and $T_p'$ is calculated at intervals of 10 ms.

5. The apparatus of claim 2, wherein the predetermined relationship is defined as $$N' = \frac{1}{n_1} \times N + \frac{n_1 - 1}{n_1} \times RAM.E'$$

where $N'$ is the weighted average, $N$ is the calculated value of said first parameter, RAM.E' is a previously obtained weighted average value of $N'$, and $n_1$ is a predetermined integer constant.

6. The apparatus of claim 5, wherein $n_1$ is in the range of 32 to 128, and $N'$ is calculated at intervals of 10 ms.

7. A spark timing control method for use with a spark ignition of a fuel injected internal combustion engine, comprising the steps of;
   sensing the engine speed to output a first parameter indicative of the engine speed;
   calculating a fuel injection amount using the first parameter and at least a second operational parameters to output a third parameter indicative of the fuel injection amount;
   smoothing at least one of the first and third parameters;
   detecting whether a throttle valve controlling the intake air flow into the engine is completely closed;
   selecting, when said throttle valve is not completely closed, which of said parameters should be smoothed; and
   determining, when said throttle valve is not completely closed, a spark timing using the first and third parameters, at least one of which is already smoothed.

8. The method of claim 7, wherein said smoothing step includes taking a weighted average of at least one of the first and third parameters according to a predetermined relationship.

9. The method of claim 8, wherein the predetermined relationship is defined as $$T_p' = \frac{1}{n} \times T_p + \frac{n-1}{n} \times RAM.E$$

where $T_p'$ is the weighted average, $T_p$ is the calculated value of the third parameter, RAM.E is a previously obtained weighted average of $T_p'$, and n is a predetermined integer constant.

10. The method of claim 9, wherein n is in the range of 32 to 128, and $T_p'$ is calculated at intervals of 10 ms.

11. The method of claim 10, wherein the value of n is 64.

12. The method of claim 8, wherein the predetermined relatinship is defined as $$N' = \frac{1}{n_1} \times N + \frac{n_1 - 1}{n_1} \times RAM.E'$$

where $N'$ is the weighted average, $N$ is the calculated value of said first parameter, RAM.E' is a previously obtained weighted average value of $N'$, and $n_1$ is a predetermined integer constant.

13. The method of claim 12, wherein $n_1$ is in the range of 32 to 128, and $N'$ is calculated at intervals of 10 ms.

14. The method of claim 7 wherein the smoothing step includes taking a weighted average of said first parameter according to a first predetermined relationship and a weighted average of said third parameter according to a second predetermined relationship.

15. The method of claim 14, wherein the second predetermined relationship is defined as:

$$T_p{'} = \frac{1}{n} \times T_p + \frac{n-1}{n} \times RAM.E$$

where $T_p{'}$ is the weighted average, $T_p$ is the calculated value of the third parameter, RAM.E is a previously obtained weighted average value of $T_p{'}$, and n is a predetermined integer constant, wherein the first predetermined relationship is defined as:

$$N' = \frac{1}{n_1} \times N + \frac{n_1-1}{n_1} \times RAM.E'$$

where N' is the weighted average, N is the calculated value of said first parameter, RAM.E' is a previously obtained weighted average value N', and $n_1$ is a predetermined integer constant.

16. The method of claim 15, wherein n and $n_1$ are in the range of 32 to 128, and $T_p{'}$ and N' are calculated at intervals of 10 ms.

17. The method of claim 16, wherein the value of n and $n_1$ is 64.

18. A spark timing control apparatus for use with a spark ignition, fuel injected, internal combustion engine, comprising:
    means for sensing the engine speed and outputting a first parameter indicative of the engine speed;
    means for calculating a fuel injection amount using the first parameter and at least a second operational parameter and outputting a third parameter indicative of the fuel injection amount;
    means for storing the value of the calculated fuel injection amount;
    means for comparing an absolute value of a difference between a current and immediately preceding value of at least one of said first and third parameters with a predetermined value;
    means for smoothing at least one of the first and third parameters;
    a throttle valve for controlling intake air flow into the engine;
    means for detecting whether the throttle valve is completely closed;
    means operable, whenever the absolute value of said difference is smaller than the predetermined value, for determining spark timing using the first and third parameters, at least one of which is smoothed by the smoothing means, and operable, whenever the absolute value of said difference is not smaller than the predetermined value to determine spark timing, using unsmoothed first and third parameters;
    said determining means further being operable, when the throttle valve is not closed, to select which of said first and third parameters should be smoothed and used for determining spark timing.

19. The apparatus of claim 18, wherein said smoothing means includes means for taking a weighted average of at least one of said first and third parameters according to a predetermined relationship.

20. The apparatus of claim 19, wherein the predetermined relationship is defined by $$T_p{'} = \frac{1}{n} \times T_p + \frac{n-1}{n} \times RAM.E$$

where $T_p{'}$ is the weighted average, $T_p$ is the calculated value of said third parameter, RAM.E is a previously obtained weighted average value $T_p{'}$, and n is a predetermined integer constant.

21. The apparatus of claim 20, where $T_p$ designates the fuel injection amount, n is in the range of 32 to 128, and $T_p{'}$ is calculated at intervals of 10 ms.

22. The method of claim 19, wherein the predetermined relationship is defined by $$N' = \frac{1}{n_1} \times N + \frac{n_1-1}{n_1} \times RAM.E$$

where N' is the weighted average, N is the calculated value of the first parameter, RAM.E is a previously obtained weighted average value of N', and $n_1$ is a predetermined integer constant.

23. The apparatus of claim 22, wherein $n_1$ is in the range of 32 to 128, and N' is calculated at intervals of 10 ms.

24. A spark timing control method for use with a spark ignition of a fuel injected internal combustion engine, comprising the steps of:
    sensing the engine speed and outputting a first parameter indicative of the engine speed;
    calculating a fuel injection amount using the first parameter and at least a second operational parameter and outputting a third parameter indicative of the fuel injection amount;
    storing the value of the calculated fuel injection amount;
    comparing the absolute value of the difference between a current and an immediately preceding value of at least one of said first and third parameters with a corresponding predetermined value;
    smoothing at least one of the first and third parameters;
    determining spark timing using the first parameter and third parameters, at least one of which is already smoothed, the determining step further comprising:
        detecting whether a throttle valve controlling intake air flow into the engine is completely closed, and
        selecting, when the throttle valve is not closed, which of said first and third parameters should be smoothed and used.

25. The method of claim 24, wherein said smoothing step includes taking a weighted average of at least one of the first and third parameters according to a predetermined relationship.

26. The method of claim 25, wherein the predetermined relationship is defined as:

$$T_p{'} = \frac{1}{n} \times T_p + \frac{n-1}{n} \times RAM.E$$

where $T_p{'}$ is the weighted average, $T_p$ is the calculated value of the third parameter, RAM.E is a previously obtained weighted average of $T_p{'}$, and n is a predetermined integer constant.

27. The method of claim 26, wherein n is in the range of 32 to 128, and $T_p{'}$ is calculated at intervals of 10 ms.

28. The method of claim 27, wherein the value of n is 64.

29. The method of claim 25, wherein the predetermined relationship is defined as:

$$N' = \frac{1}{n_1} \times N + \frac{n_1 - 1}{n_1} \times RAM.E'$$

where $N'$ is the weighted average, $N$ is the calculated value of said first parameter, $RAM.E'$ is a previously obtained weighted average value of $N'$, and $n_1$ is a predetermined integer constant.

30. The method of claim 29, wherein $n_1$ is in the range of 32 to 128, and $N'$ is calculated at intervals of 10 ms.

31. The method of claim 24, wherein the smoothing step includes taking a weighted average of said first parameter according to a first predetermined relationship and a weighted average of said third parameter according to a second predetermined relationship.

32. The method of claim 31, wherein the second predetermined relationship is defined as:

$$T_p' = \frac{1}{n} \times T_p + \frac{n - 1}{n} \times RAM.E$$

where $T_p'$ is the weighted average, $T_p$ is the calculated value of the third parameter, $RAM.E$ is a previously obtained weighted average value of $T_p'$, and $n$ is a predetermined integer constant, wherein the first predetermined relationship is defined as:

$$N' = \frac{1}{n_1} \times N + \frac{n_1 - 1}{n_1} \times RAM.E'$$

where $N'$ is the weighted average, $N$ is the calculated value of said first parameter, $RAM.E'$ is a previously obtained weighted average value $N'$, and $n_1$ is a predetermined integer constant.

33. The method of claim 32, wherein $n$ and $n_1$ are in the range of 32 to 128, and $T_p'$ and $N$ are calculated at intervals of 10 ms.

34. The method of claim 33, wherein the value of n and $n_1$ is 64.

* * * * *